United States Patent [19]
Nakano et al.

[11] Patent Number: 5,742,568
[45] Date of Patent: Apr. 21, 1998

[54] TRACKING CONTROLLER AND SEEK CONTROLLER FOR OPTICAL RECORDING DEVICE

[75] Inventors: Junichi Nakano, Hino; Kenichi Ito, Hachioji, both of Japan

[73] Assignee: Olympus Optical Co., Ltd., Tokyo, Japan

[21] Appl. No.: 659,668

[22] Filed: Jun. 5, 1996

[30] Foreign Application Priority Data

Jun. 9, 1995 [JP] Japan .................................. 7-143701
Aug. 2, 1995 [JP] Japan .................................. 7-197717

[51] Int. Cl.$^6$ .................................................. G11B 17/22
[52] U.S. Cl. ...................... 369/32; 369/44.36; 369/44.32
[58] Field of Search ........................ 369/32, 124, 44.27, 369/44.28, 44.29, 44.34, 44.35, 44.36, 44.32

[56] References Cited

U.S. PATENT DOCUMENTS

| | | | |
|---|---|---|---|
| 5,033,037 | 7/1991 | Yanagi | 369/32 |
| 5,182,736 | 1/1993 | Yanagi | 369/32 |
| 5,241,522 | 8/1993 | Yanagi | 369/32 |
| 5,457,671 | 10/1995 | Takata et al. | 369/44.28 |
| 5,499,230 | 3/1996 | Yanagi | 369/124 |
| 5,566,152 | 10/1996 | Takamine et al. | 369/44.28 |

FOREIGN PATENT DOCUMENTS

| | | |
|---|---|---|
| 63-224037 | 9/1988 | Japan . |
| 4-301224 | 10/1992 | Japan . |
| 5-47125 | 2/1993 | Japan . |

*Primary Examiner*—Tan Dinh
*Attorney, Agent, or Firm*—Armstrong, Westerman, Hattori, McLeland & Naughton

[57] ABSTRACT

A control circuit for use in an optical disk apparatus, which includes a carriage provided with a focus moving mechanism for supporting an objective lens; a carriage driving circuit for driving the carriage; and a tracking error detecting circuit for detecting a tracking error signal which represents a displacement of the light beam form the center of the information track. In the control circuit, a tracking control loop for performing a tracking control by feeding back a dc-component and ac-components, with frequencies which are not more than 10 kHz, of the tracking error signal to the carriage driving circuit is formed. Further, a filter device for attenuating the gain of the tracking control loop correspondingly to a frequency in the vicinity of a resonance frequency in a direction, in which the focus moving mechanism or the carriage crosses the information track, is provided in the tracking control loop. Moreover, the open-loop or overall gain crossover frequency of the tracking control loop is not less than 2 kHz.

15 Claims, 9 Drawing Sheets

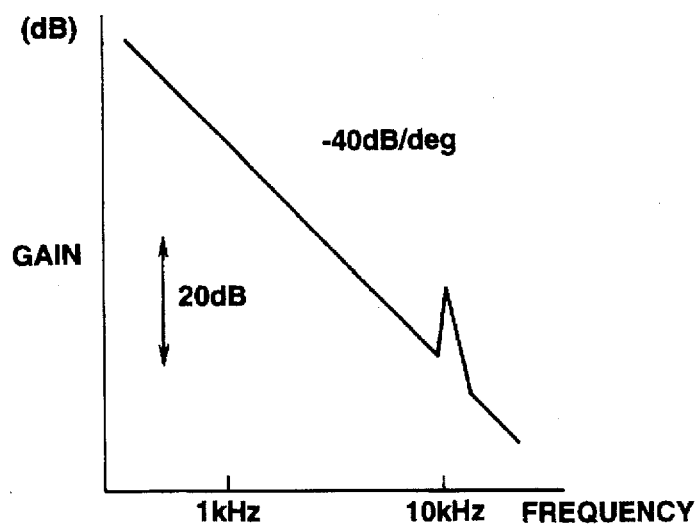
FIG.8
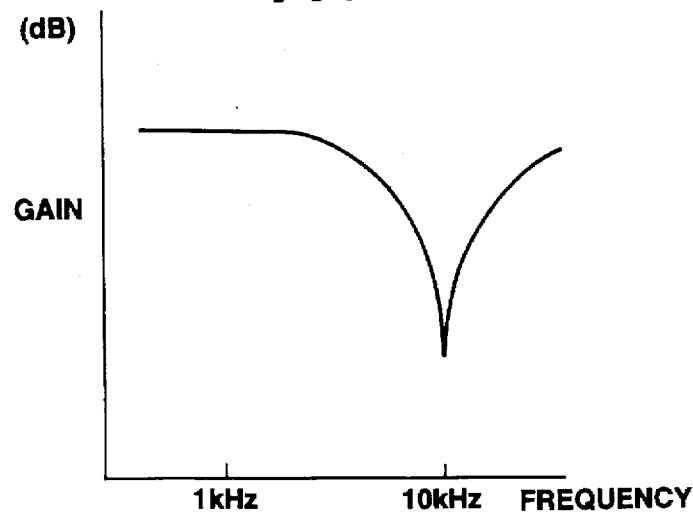
FIG.9
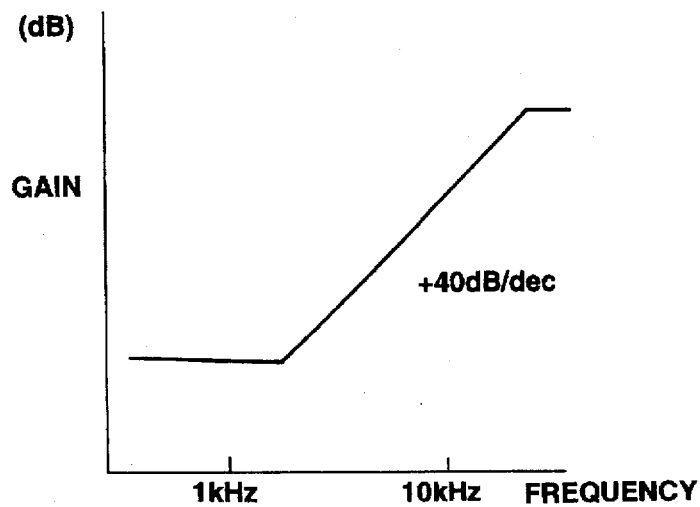

5,742,568

TRACKING CONTROLLER AND SEEK CONTROLLER FOR OPTICAL RECORDING DEVICE

BACKGROUND OF THE INVENTION

1. Field of the Invention

The present invention relates to a control circuit of an optical disk (or disc) apparatus for recording and reproducing information on a disk-like optical recording medium.

2. Description of the Related Art

A method of performing both of a tracking control operation and an access control operation on an optical head of an optical disk apparatus through the use of thrust developed by a same coil is effectual in reducing the cost of a tracking control system thereof. Namely, the cost of the apparatus can be decreased by employing a configuration thereof in which both of fine and coarse actuating control operations are performed by a single actuator, instead of a configuration in which a fine actuator (which is used for performing a tracking control operation and has a narrow moving range) and a coarse actuator (which is used for performing an access control operation and has a wide moving range) are provided separately from each other. Examples of such an apparatus, in which both of the tracking control operation and the access control operation can be achieved by a single actuator, are disclosed in Japanese Patent Laid-Open No. 63-224037/1988 Official Gazette and so forth.

Generally, in the case of the actuator by which both of fine and coarse actuating control operations can be achieved, it is difficult to increase a high-order resonance frequency. Thus, the gain thereof in the case of a tracking control operation cannot be increased to a high level (namely, a high gain crossover frequency thereof cannot be obtained). It is, accordingly, difficult for such an actuator to follow (or respond to) the high-speed rotation of a disk. Such an actuator, therefore, has encountered the problem that even if a seeking operation of moving an optical head to an arbitrary track can be achieved at a high speed, an access time required to access an arbitrary sector becomes long in the case that the rotational speed of the disk (namely, the disk-rotation rate) is low, and even after accessed, a data transfer rate cannot be increased.

To solve this problem, in accordance with the techniques described in Japanese Patent Laid-Open No. 4-301224/1992 Official Gazette, an optical disk device is provided with an observer for adding a driving signal for an actuator to a tracking error signal obtained from a photodetector of an optical head after these signals are filtered by appropriate filters, respectively. Further, an output of this observer is fed back to the actuator. Thereby, the resonance of the actuator can be suppressed. Moreover, a servo band can be set in a high frequency domain.

However, only in regard to the target position tracking characteristics, the frequencies of the servo band can be boosted (namely, the loop gain of the device can be increased) by using the techniques described in the aforementioned Official Gazette. The loop gain thereof, however, is not increased in regard to the suppression of influence of a disturbance (namely, the response to (or the follow-up property with respect to) the disturbance), which is a main object of a servo. Assuming that a tracking control loop is cut off at the target position in the device described in the aforesaid Official Gazette, the loop gain becomes high owing to the effect of the observer. In contrast, assuming that the tracking control loop is cut off at a point, to which the disturbance is applied (namely, at a point just prior to the photodetector), the loop gain does not reach a high level.

Therefore, the techniques described in Japanese Patent Laid-Open No. 4-301224/1992 has faced the problem that in the case when a high eccentric acceleration of a track formed on the disk is caused by, for example, increasing the rotational speed of the disk, or when a strong vibration is applied thereto from the exterior, the gain is in sufficient for following a track position varying with the applied disturbance and thus the tracking accuracy cannot be ensured.

Further, this Official Gazette describes that regarding an access control operation (referred also as a seek control operation), an objective lens is fixed therein in the tracking direction (namely, along a radius of the disk), that thus it is unnecessary to perform such a control operation on the objective lens and that a control operation based on a detection of the absolute position of the optical head will suffice. However, actually, a focus control responds to an axial deflection of the optical disk. Thus, the objective lens moves by a distance on the order of several hundred micrometers in the focusing direction (namely, in a direction perpendicular to the disk). Further, the objective lens may be displaced in the tracking direction. For instance, in the case of supporting the objective lens by a plate (or leaf) spring, the objective lens may be displaced 10 μm or so in the tracking direction owing to the displacement in the focusing direction of the objective lens caused by a focusing control. This displacement in the tracking direction thereof is several times as large as a track pitch and is thus appreciably large.

Namely, in the case of the device in which both of a tracking control operation and an access control operation are performed by a single actuator, the actual position of an objective lens (namely, the position of a light beam) is not necessarily controlled with good accuracy even if a control operation is performed on the position of an optical head when carrying out a seek control operation. It is, thus, difficult to perform the seek control operation correctly. Consequently, the device has drawbacks in that a correction seek operation is needed and that thus a seek time, which is required to reach a target track or sector, and an access time become long.

As above described, in order to eliminate the influence of high-order resonance of an actuator, there has been devised a method of using a configuration wherein a filter such as a twin-T filter (namely, a notch filter), which is effective in the vicinity of the high-order resonance frequency of the actuator, is inserted into a control loop. However, if the twin-T filter, whose dip frequency is low (namely, is close to a gain crossover frequency), is inserted into the control loop, this method has faced the problem that a large phase lag occurs at the gain crossover frequency due to the twin-T filter and that a phase margin decreases.

As a method for solving this problem, there can be cited a method described in Japanese Patent Laid-Open No. 5-47125/1993, namely, a method by which a suitable signal is inputted from the exterior to a servo loop, and subsequently, the resonance frequency is obtained from a response of the servo system to the signal and further, a notch filter is configured in such a way that the gain is minimized at the frequency. When employing this method, the characteristics of the notch filter can be adjusted even in the case that there is an initial variation in the resonance frequency and that the resonance frequency varies with temperature change. Thus, this method has advantages in that a notch filter, which has a narrow frequency band and a large Q, can be used and that a phase lag is hard to occur at a frequency which is in the vicinity of the gain crossover of the servo loop.

However, generally, the actuator has a plurality of resonance modes. It is, thus, very difficult to correctly measure the high-order resonance frequency in question from a response thereof to an applied signal, similarly as in the case of the aforementioned conventional means. Especially, in the case of using a notch filter having a narrow frequency band, attenuation characteristics largely vary when the frequency lightly changes. Thus, a measurement error directly results in the deterioration of the servo characteristics. Consequently, it is difficult to eliminate the influence of the high-order resonance with reliability.

Moreover, expensive hardware or complex software is required to measure the high-order resonance frequency. Thus, the cost is a disadvantage of this method.

OBJECTS AND SUMMARY OF THE INVENTION

It is an object of the present invention to provide a control circuit, which can perform both of a sufficiently accurate tracking control operation and an accurate access control operation, of an optical disk apparatus even in the case where the optical disk apparatus uses an actuator serving as a coil for performing both of a tracking control operation and an access control operation.

It is another object of the present invention to provide a control circuit of an optical disk apparatus, by which the gain crossover frequency of a tracking control loop can be set at a high frequency even if the resonance frequency of an actuator is low, and by which the tacking accuracy can be ensured even when an optical disk is rotated at a high rotational speed.

It is a further object of the present invention to provide a control circuit of an optical disk apparatus, by which even when the displacement of a light beam in a tracking direction due to the driving of the light beam in a focusing direction or the eccentricity of an information track on an optical disk occurs, the travelling speed of the light beam relative to the information track can be controlled with sufficient accuracy and thus a stable seek operation can be achieved and consequently, an access time can be reduced.

It is still another object of the present invention to provide a control circuit of an optical disk apparatus, in which a servo system being capable of responding to a change in the high-order resonance frequency can be realized by achieving the insertion of a notch filter, which has a narrow band and a small Q, even when the high-order resonance frequency of an actuator is close to the gain crossover frequency of the servo system and thus the dip frequency of a notch filter has to be close to the gain crossover frequency, whereby the servo system, which has a simple structure, can be configured at a low cost.

It is yet another object of the present invention to provide a control circuit of an optical disk apparatus, by which the phase margin and the gain margin of a servo system, in which the high-order resonance frequency of an actuator is close to the gain crossover frequency, can be sufficiently ensured even when a notch filter, which has a small Q and further has a dip frequency close to this gain crossover frequency, is inserted thereinto.

It is still another of the present invention to provide a control circuit of an optical disk apparatus, by which the gain crossover frequency can be set at a high frequency while a phase margin and a gain margin are ensured, and an inexpensive stable tracking control system can be realized even when using an actuator obtained by combining a fine actuator and a coarse actuator, which are hard to have high-order resonance frequencies set at high frequencies, with each other as a single unit.

In accordance with an aspect of the present invention, there is provided a control circuit for use in an optical disk apparatus, which comprises:

a carriage, which is provided with a focus moving means for supporting an objective lens in such a way that the objective lens is movable in a direction of an optical axis of a light beam applied to the optical disk apparatus through the objective lens and is almost fixed in a direction perpendicular to an information track on the optical disk, for moving the light beam in a direction nearly perpendicular to the information track in a range in which at least the information track is present;

carriage driving means for driving the carriage; and a tracking error detecting circuit for detecting a tracking error signal which represents a displacement of the light beam from the center of the information track, wherein a tracking control loop for performing a tracking control by feeding back a dc-component and ac-components, whose frequencies are not more than 10 kHz, of the tracking error signal to the carriage driving means is formed, wherein filter means for attenuating the gain of the tracking control loop correspondingly to a frequency in the vicinity of a resonance frequency in a direction, in which the focus moving means or the carriage crosses the information track, is provided in the tracking control loop, wherein the open-loop (or overall) gain crossover frequency of the tracking control loop is not less than 2 kHz.

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 7 is a graph showing the frequency characteristics of the displacement in a tracking direction of a light beam when the carriage is driven in a current-controlled manner in a second embodiment of the present invention;

FIG. 8 is a graph showing the frequency characteristics of a twin-T filter of the second embodiment of the present invention;

FIG. 9 is a graph showing the frequency characteristics of a phase compensation circuit of the second embodiment of the present invention;

DETAILED DESCRIPTION OF THE PREFERRED EMBODIMENTS

Figure 1:
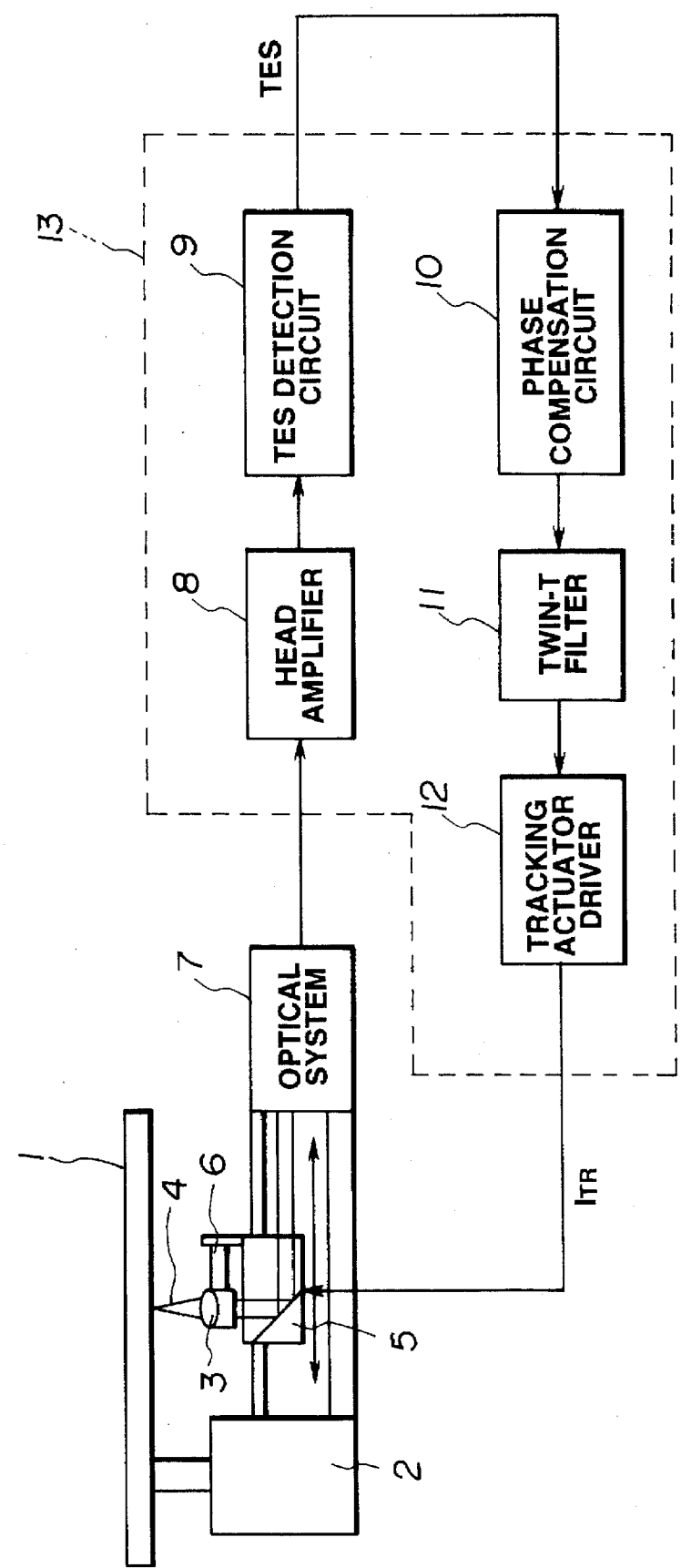
FIG. 1 is a block diagram illustrating the configuration of a tracking control system of an optical disk apparatus according to a first embodiment of the present invention.

FIG. 1 illustrates the configuration of a tracking control system of an optical disk apparatus according to a first embodiment of the present invention. In this figure, the drawing of parts having no direct bearing on the description of this embodiment, for example, a reproduced-signal processing circuit, an interface circuit to a host computer, or a focus control circuit, is omitted.

The optical disk apparatus is loaded with an optical disk 1, on which information tracks for recording information thereon are provided. Further, the optical disk is provided with a spindle motor 2 for driving and rotating the optical disk 1. Moreover, the optical disk apparatus is further provided with an objective lens 3 for applying a light beam onto an information track on the optical disk 1, a focus actuator 6 acting as a focus moving means for driving the objective lens 3 in the direction of the optical axis (namely, an upward or downward direction in this figure (hereunder referred to as a focusing direction)), a carriage 5 which is loaded with the objective lens 3 and the focus actuator 6 and is able to move in the direction of a radius of the optical disk 1, and an optical system 7 containing a laser diode serving as a light source and a photodetector, as composing elements of an optical head for recording information on and reproducing information from the optical disk 1.

Further, in this embodiment, there is formed a tracking control circuit 13 which has a head amplifier 8 for amplifying an output current of the photodetector, a tracking error signal detection circuit (namely, a TES detection circuit) 9 for detecting a tracking error signal from an output of the photodetector, a phase compensation circuit 10 for performing a phase compensation of the tracking error signal so as to stabilize a tracking control system, a twin-T filter (namely, a notch filter) 11 for attenuating a specific frequency component of an output signal of the phase compensation circuit 10, and a tracking actuator driver 12 for supplying a driving signal to a coil for driving the carriage 5 on the basis of an output signal of the twin-T filter 11.

The carriage 5 can move in the direction (in this figure, in a lateral direction (hereunder referred to as a tracking direction)), in which the carriage 5 crosses the information track on the optical disk 1, together with the objective lens 3 and the focus actuator 6 in response to a driving current $I_{TR}$ supplied from a tracking actuator driver 12 in such a way that all of the information tracks can be irradiated with the light beam 4. The periphery of the carriage 5 and the focus actuator 6 can be configured as illustrated in, for instance, FIG. 2.

Figure 2:
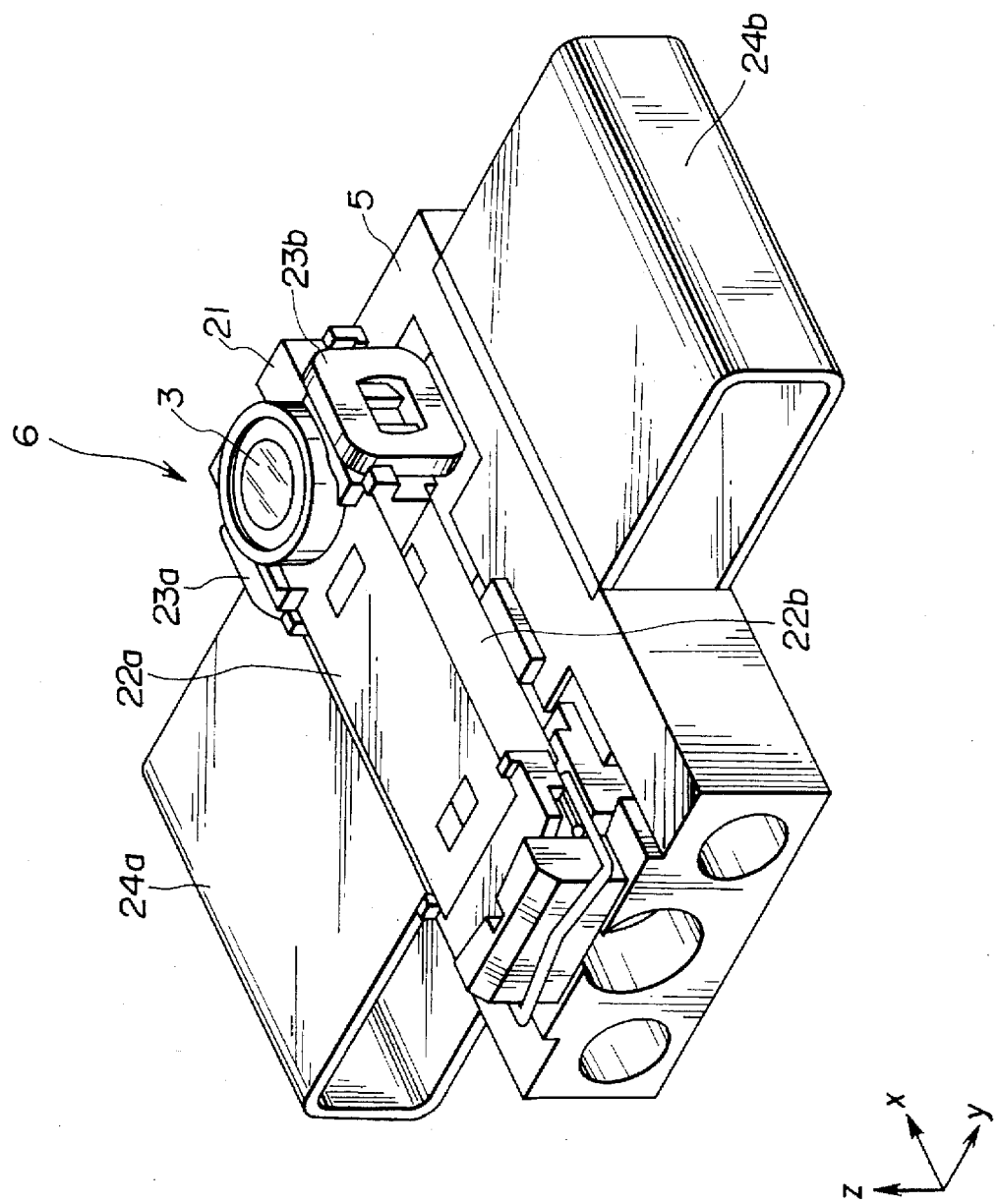
FIG. 2 is a perspective diagram illustrating an example of the configuration of the periphery of a carriage and a focus actuator of an optical head.

As shown in FIG. 2, the focus actuator 6 is composed of a holder 21 for fixing an objective lens 3, plate springs 22a and 22b for supporting the objective lens 3 in such a way that the objective lens 3 can be moved in the focusing direction but is almost fixed in the tracking direction, and focus coils 23a and 23b for driving the objective lens 3. Further, the carriage 5 is loaded with the focus actuator 6 on the upper part thereof and is provided with tracking coils 24a and 24b acting as carriage driving means on both of the side parts thereof, respectively.

Figure 3:
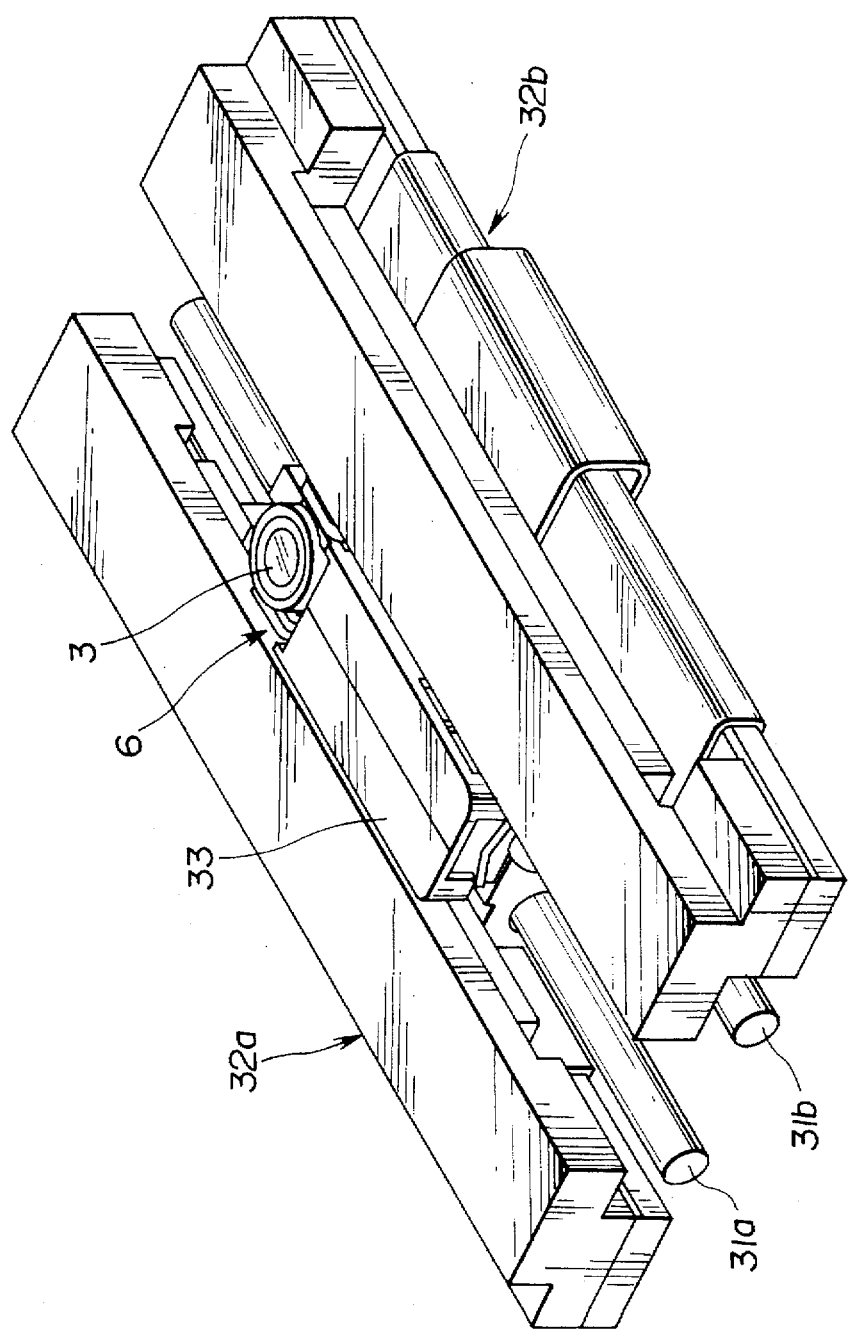
FIG. 3 is a perspective diagram illustrating an example of the configuration of the periphery of the optical head into which the carriage and the focus actuator of FIG. 2 are incorporated together with magnetic circuits.

The optical head is constituted by assembling the carriage 5 and the focus actuator 6, which are configured in this way, together with guide shafts 31a and 31b and magnetic circuit 32a and 32b, as illustrated in FIG. 3. Thus, the focus actuator 6 can be driven in the focusing direction by energizing the focus coils 23a and 23b. Further, the carriage 5 can be driven in the tracking direction by energizing the tracking coils 24a and 24b. When driving the carriage 5, the light beam 4 is also driven in the tracking direction. The tracking actuator is constituted by these element. Incidentally, when incorporating the focus actuator 6 thereinto, the plate springs 22a and 22b are covered with a cover 33 as shown in FIG. 3.

Next, an operation of the tracking control system constructed in this way will be described hereinbelow.

First, the spindle motor 2 is run at a predetermined speed by a motor control circuit (not shown). Then, a laser diode contained in the optical system 7 is made to emit light at a predetermined output under the driving control of a laser control circuit (not shown). Subsequently, the focus actuator 6 is driven and controlled by the focus control circuit (not shown). Thus, the position in the focusing direction of the objective lens 3 is controlled in such a manner that the light beam 4 is focused to a spot an information track on the optical disk 1. Reflected light, which is obtained when this light beam 4 is reflected on the optical disk 1, is received by the photodetector of the optical system 7. Then, an output signal of the photodetector is amplified by the head amplifier 8. Further, the amplified signal is outputted to the tracking error signal detection circuit 9.

In this state, the tracking error signal detection circuit 9 generates a tracking error signal TES, which indicates a displacement between a place, which is irradiated with the light beam 4, on the optical disk and the center of the information track, based on the output of the photodetector. Usually, the level of the tracking error signal becomes zero at the center of the information track and at about the midpoint position between the tracks, so that the tracking error signal varies like a sinusoidal wave in response to the displacement of the light beam.

Figure 4A:
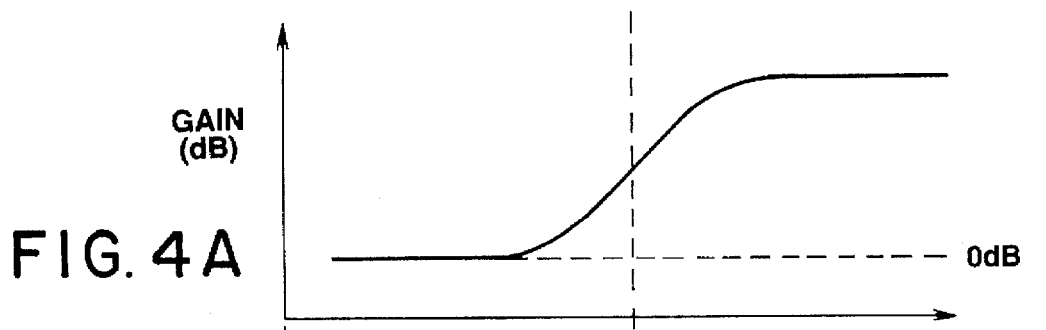
FIG. 4 is a graph showing the frequency characteristics of a phase compensation circuit provided in the first embodiment of the present invention.
Figure 4B:
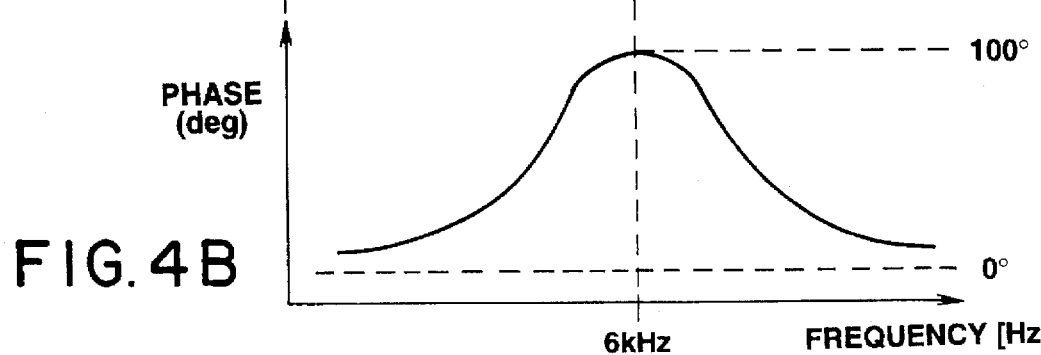

The tracking error signal outputted from the tracking error signal detection circuit 9 is inputted to the phase compensation circuit 10 whereupon the phase compensation of the inputted signal is performed. Examples of the frequency characteristics of the phase compensation circuit 10 are shown in FIG. 4. FIG. 4 illustrates the gain-frequency characteristics and the phase-frequency characteristics of the phase compensation circuit 10. For example, a frequency, at which a largest phase lead is obtained, is 6 kHz. At this frequency, the largest phase lead is set at 100 degrees or so. Such a phase compensation circuit 10 can be realized by connecting two stages of phase lead circuits, which have the center frequency of 6 kHz and further have the large phase lead of 50 degrees, in series with each other.

An output signal of the phase compensation circuit 10 is inputted to a twin-T filter 11 whereupon a specific frequency component of this signal is attenuated. The twin-T filter 11 is a T-filter circuit constituted by CR (capacitance-resistance) elements. The twin-T filter 11 has a twin-T circuit, in which a first component consisting of CR elements connected like a letter T and a second component obtained by replacing C with R in the first component are connected in parallel with each other, and also has transfer characteristics in which a dip point is at a resonance frequency.

Figure 5A:
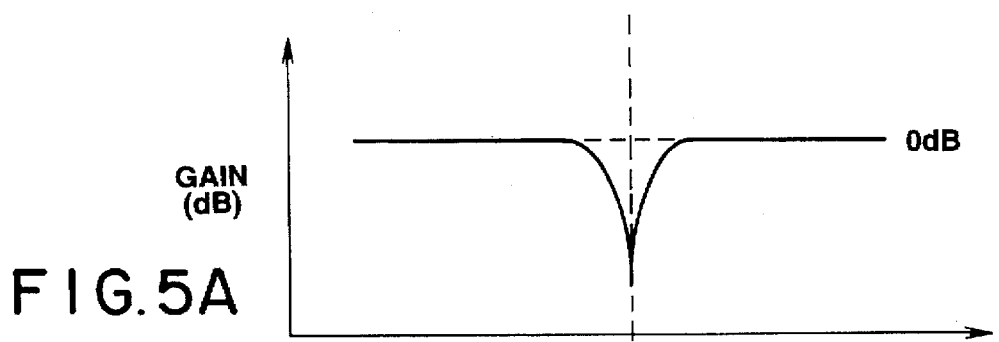
FIG. 5 is a graph showing the frequency characteristics of a twin-T filter provided in the first embodiment of the present invention.
Figure 5B:
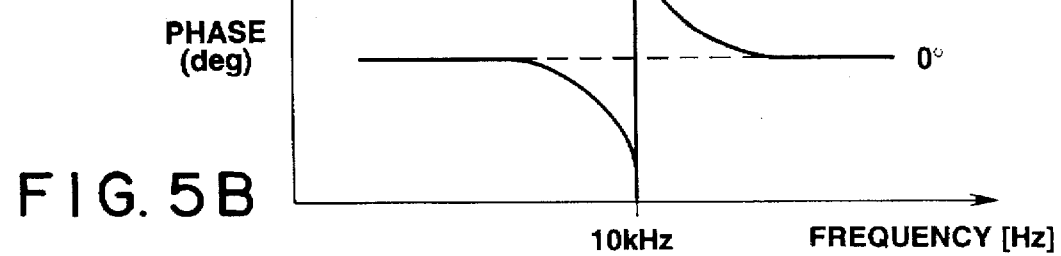

The frequency characteristics of the twin-T filter 11 has the frequency characteristics of FIG. 5, in which frequency components, whose frequencies are in the vicinity of a specific one, are highly attenuated but the other frequency components are hardly attenuated. FIG. 5 shows examples of the gain-frequency characteristics and the phase-frequency characteristics of the twin-T filter 11. A frequency (namely, a dip frequency), at which the gain is most reduced, is set at, for example, 10 kHz in accordance with the resonance frequencies in the tracking direction of the carriage 5 and the focus actuator 6. Further, Q of the twin-T filter 11 has only to be set at, for instance, 1.0 or so.

An output signal of the twin-T filter 11 is inputted to a tracking actuator driver 12 which then performs the negative feedback of this signal to the carriage as a driving current $I_{TR}$. This driving current $I_{TR}$ drives the carriage 5 in a direction in which the position shift (or displacement) of the light beam 4, which is detected by the tracking error signal detection circuit 9.

The position in the tracking direction of the light beam 4 is shifted by feeding back the tracking error signal in this way to the tracking coils 24a and 24b for driving the carriage in such a way that the level of the tracking error signal becomes zero. Thus the tracking control operation of causing the light beam 4 to follow the center of the information track is performed.

Here, in the case that a frequency (namely, a gain crossover frequency), at which the open-loop (or overall) gain of the tracking control loop of FIG. 1 is 0 dB, is set at, for example, 3 kHz or so, sufficient tracking precision can be obtained even when rotating the optical disk 1 at a high speed.

The aforementioned gain crossover frequency is determined by performing the following calculation. Assuming that the optical disk is rotated at the rate of 4000 rpm and the eccentric acceleration is 15 m/s$^2$ and the servo system being capable of causing the light beam to follow the track with the accuracy of 0.1 µm, a necessary gain G at a frequency f [Hz] is obtained by $$G = 15/(2\pi f)^2/0.1 \times 10^{-6} \tag{1}$$

Figure 6:
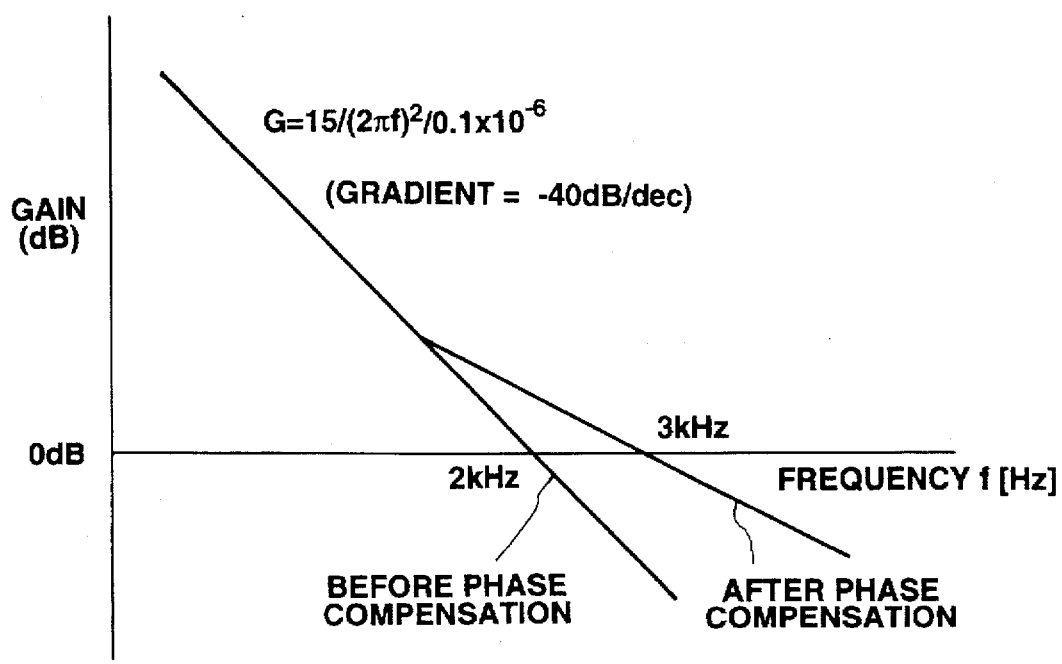
FIG. 6 is a graph showing the gain-frequency characteristics of a tracking control loop of the first embodiment of the present invention.

The relation between the gain and the frequency in this case is shown in FIG. 6. The gain crossover frequency is a frequency at which the gain G is 1 (corresponding to 0 dB). Thus, in the case of the aforementioned conditions, the gain crossover frequency is about 2 kHz. Here, if additional phase lead compensation is performed in such a way that the gain in low frequency zone is unchanged, the gain crossover frequency becomes about 1.5 times that in the former case where the additional phase lead compensation is not performed. Thus the gain crossover frequency obtained after the phase compensation is about 3 kHz. Incidentally, if the rotational speed of the disk is low and the eccentric acceleration is low, the gain crossover frequency may be further low. However, even if the rotational speed of the disk is 3000 rpm, the gain crossover frequency obtained after the phase lead compensation should be 2 kHz or so.

Additionally, in the case of this embodiment, only the phase lead compensation circuit and the twin-T filter are provided as electrical filters. However, a phase lag compensation filter, which is used for enhancing the trackability of the system to follow the track in a low frequency zone, and what is called a high-reject filter (namely, a low-pass filter (LPF)), which is used for alleviating the influence of noises having frequencies in a high frequency zone, may be added to the circuit. In the case of adding the high-reject filter to the circuit, if the cut-off frequency is lowered, the phase lag at the gain crossover increases and thus the control system becomes unstable. Even when the gain crossover frequency is 2 kHz, the cut-off frequency of not less than 10 kHz is necessary for reducing the phase lag at the gain crossover to a value which is not more than 10 degrees. Therefore, even in the case of adding the high-reject filter to the circuit, it is preferable that the cut-off frequency is higher than at least 10 kHz and that the frequency components, whose frequencies are not lower than 10 kHz, of the tracking error signal are also fed back to the tracking coils 24a and 24b.

As described above, in accordance with this embodiment, by providing a twin-T filter, which is operative to attenuate the frequency components corresponding to frequencies in the proximity of the resonance frequencies in the tracking direction of the focus actuator and the carriage, in the tracking control system of the optical disk apparatus using an actuator which serves as both of a coil used for performing a tracking control operation and a coil used for performing an access control (or seek control) operation. Thereby, the gain crossover frequency of the tracking control loop can be set at a high value. Thus, even when the high-order resonance frequency in the tracking direction of the actuator is low, a stable control system can be obtained. Further, even when rotating the optical disk at a high rotational speed, sufficient tracking accuracy can be ensured.

Next, referring to FIGS. 7 to 10, there is illustrated another example of the setting of the phase compensation circuit 10 and the twin-T filter 11 of the tracking control system of FIG. 1, as a second embodiment of the present invention.

Here, it is assumed that the frequency characteristics of the displacement in the tracking direction of the light beam 4 at the time of driving the carriage 5 in a current-controlled manner are as of a quadratic (or second-order) integral element (or system) which has a resonance point at a frequency of 10 kHz as illustrated in FIG. 7. Incidentally, the resonance occurring in the vicinity of a frequency of 10 kHz is that of the carriage 5 itself or that in the tracking direction of the plate springs 22a and 22b, which support the objective lens 3 and are used for focusing.

First, the dip frequency (namely, a frequency at which the gain is minimum) of the twin-T filter 11 is set as illustrated in FIG. 8, in accordance with this resonance frequency. A twin-T filter 11 is a T-filter circuit constituted by using, for example, CR elements (capacitance-resistance). As is shown in the gain-frequency characteristics of FIG. 8, this circuit has transfer characteristics, in which a dip point is at the resonance frequency in such a manner that the components having frequencies in the vicinity of the resonance frequency is highly attenuated but the other frequency components are hardly attenuated. Further, Q of the filter is set at, for example, 1.0. Thus, in this case, the transfer function of the twin-T filter is expressed as the following s-function:

$$H(s) = (s^2 + 3.9 \times 10^9)/(s^2 + 6.2 \times 10^4 s + 3.9 \times 10^9) \tag{2}$$

Next, the characteristics of the phase compensation circuit 10 will be examined hereinbelow. Here, it is assumed that no phase lag compensation is performed. Thus, only a phase lead compensation filter will be described hereunder.

Here, note that the breakdown of a necessary phase lead is given as follows: a phase margin (45 degrees or so) of the tracking control system; a phase lag (10 degrees or so) of the peripheral circuit such as the tracking actuator driver 12; a phase lag (15 degrees or so) due to a delay time caused by sampling and computing operations in the case of performing the phase compensation by means of a digital filter; and a phase lag (30 degrees or so) due to the aforementioned twin-T filter 11. The phase lead generated in the tracking control system is a total of these phase margin and lags. Thus, in the case of this system, the phase lead thereof should be at least 100 degrees or so. Incidentally, if no twin-T filter is provided therein, the phase lead thereof should be 70 degrees or so.

Further, in the case of performing digital filtering processing, the system has characteristics in which the phase lag due to the delay time abruptly increases as the frequency becomes higher. It is, thus, desired that the maximum phase lead frequency of the phase lead compensation filter should be set at a value which is slightly higher than the gain crossover frequency.

In view of these, an appropriate phase lead caused in the phase lead compensation filter (namely, the maximum value thereof) is 120 degrees or so in this case. Practically, in the case of a first phase lead filter, the phase is put forward only by 90 degrees at the maximum. Thus the phase lead compensation filter is constituted by connecting two first-order phase lead filters, each of which has a phase lead of 60 degrees, in series with each other.

The control system can be stabilized even in the case of employing a notch filter, which has a small Q (namely, has gently-changing attenuation characteristics), by setting the phase lead, which is caused in the phase lead compensation means, at a large value. Thus, a high-order resonance attenuating property can be obtained in a wide frequency range. Moreover, the phase lead compensation means is constituted by distributing the phase lead between the tow first-order phase lead filters. Thereby, a large phase lead can be obtained by the system, as a whole. Consequently, the control system can be stabilized even if the notch filter means having a smaller Q is used. Moreover, in a wider frequency range, the high-order resonance attenuating property can be obtained.

To realize a phase lead filter having a phase lead of 60 degrees, a value of 14 or so is needed as the ratio between corner frequencies (namely, the ratio between a polar frequency and a zero frequency). Here, if the zero frequency is set at 2 kHz and the frequency corresponding to the pole is set at 28 kHz, the gain-frequency characteristics of the phase compensation circuit 10 (after the first-order filters are connected in series with each other) become approximately as shown in FIG. 9.

Figure 10:
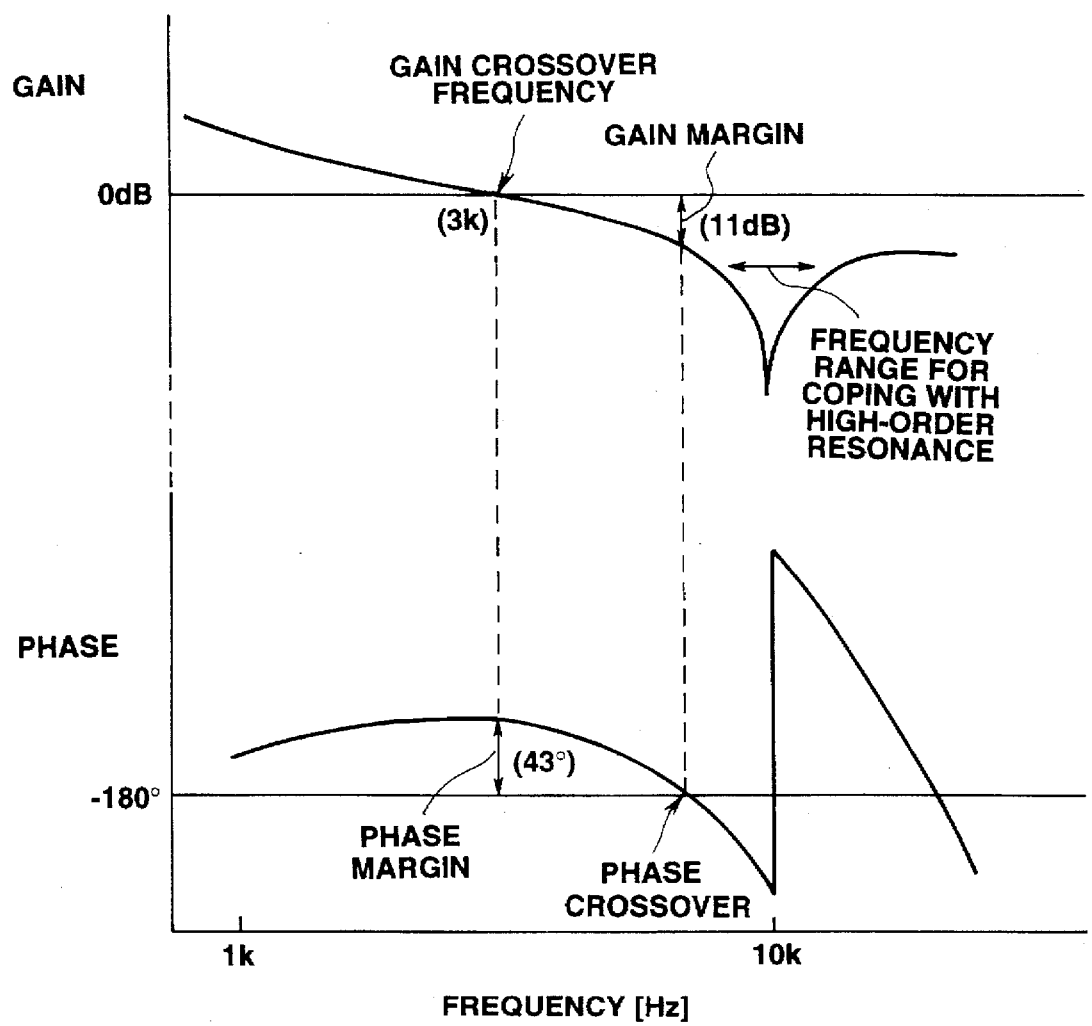
FIG. 10 is a graph showing the open-loop (or overall) frequency characteristics of the gain and the phase of a tracking control system of the second embodiment of the present invention.

The overall (or open-loop) frequency characteristics concerning the gain and the phase of the tracking control system of FIG. 10 are finally obtained by connecting the phase compensation circuit 10 and the twin-T filter 11 in series with each other. Incidentally, in FIG. 10, the resonance of the actuator at the frequency of 10 kHz is not illustrated, for readily seeing the graph. In this state, the gain crossover frequency of 3 kHz, the phase margin of 43 degrees and the gain margin of 11 dB are realized, respectively. Further, the gain attenuating characteristics for canceling the high-order resonance can be sufficiently obtained in the range between a frequency, which is lower than 10 kHz by (−10) % of 10 kHz, and another frequency which is higher than 10 kHz by 10% of 10 kHz.

Here, when connecting the phase lead compensation filter with the twin-T filter, it is preferable for preventing an occurrence of an overflow in the case of performing an operation by the digital filter and an occurrence of a saturation (namely, clipping) in the case of using an analog filter that the phase lead compensation filter is connected with the twin-T filter in such a way that two first-order phase lead filters are intervened by a twin-T filter. incidentally, the phase compensation filter may be constituted by using three or more first-order phase lead filters or using phase lead filters, whose orders are not lower than second-order, instead of using the two first-order filters.

Thus, a small-Q notch filter means, by which a sufficient phase lead is obtained, can be used by connecting phase lead filters, whose corner frequency ratios are not less than 5, in series. Consequently, practically sufficient high-order-resonance attenuating characteristics can be obtained. Moreover, a stable control system can be realized. Furthermore, in a wide frequency range, the attenuation characteristics can be obtained by decreasing the magnitude of Q of the notch filter means. Thus, even when the high-order resonance frequency of the actuator varies, the gain can be prevented from being increased owing to the resonance. Moreover, a control operation can be performed stably even when a change in resonance frequency occurs owing to a variation in the quality of actuators and to a change in temperature. Furthermore, the gain obtained at the phase crossover frequency can be lowered by the action Of a notch filter means by making the dip frequency of the notch filter means closer to the gain crossover frequency. Consequently, a large gain margin can be realized.

As described above, in accordance with this embodiment, the corner frequency of the phase lead compensation means at the higher frequency side is set in such a way as to be higher than the dip frequency of the twin-T filter. Further, sufficient phase margin and gain margin can be ensured and the gain crossover frequency can be set at a high frequency even in the case that it is difficult to set the high-order resonance frequency at a high frequency, for instance, in the case of using a tracking actuator obtained by producing both of a fine actuator and a coarse actuator as a single unit, and in the case that the high-order resonance frequency of the actuator is low and thus the dip frequency of the win-T filter has only to be set at a low frequency. Namely, the phase margin and the gain margin can be ensured by providing a small-Q wide-band notch filter in the system correspondingly to a frequency relatively close to the gain crossover frequency. Hence, a servo system, which is always stable even when the high-order resonance frequency changes, can be realized by using an inexpensive actuator without complex hardware and software Incidentally, in this embodiment, a twin-T filter, whose Q is smaller than that of the aforementioned twin-T filter (namely, whose attenuation characteristics are gentler than those of the aforementioned twin-T filter) or another twin-T filter, whose Q is larger than that of the aforementioned twin-T filter (namely, whose attenuation characteristics are sharper than those of the aforementioned twin-T filter) can be used. the smaller Q of the filter provided therein becomes, the phase lag at the gain crossover becomes larger. Thus, the phase lead caused in the phase lead compensation filter should be increased. However, in such a case, the high-resolution attenuating characteristics can be obtained in a wider frequency range. Therefore, a desired value of Q, at which the filter is set, is not more than about 3.0.

Further, a plurality of twin-T filters may be provided in the system. In this case, the idea of the present invent-ion has only to be applied to a twin-T filter whose dip frequency is close to the gain crossover frequency.

Meanwhile, information tracks of an optical disk are not formed thereon concentrically but are usually provided thereon like spirals. Therefore, in order to position the light beam onto a predetermined track, the apparatus should perform a track jumping operation of making the light beam go back by one track each revolution of the disk.

Turning now to FIG. 11f there is shown an example of the configuration of a tracking control system for performing the track jumping operation, as a third embodiment of the present invention.

In the case of the third embodiment, a tracking control circuit 43 is configured by providing a switch 41, which is used to open and close the tracking control loop, and an adder 42, which is used to add a jump pulse to an output of the twin-T filter 11, between the twin-T filter 11 and the tracking actuator driver 12, in addition to the composing elements of FIG. 1.

In this configuration, during a time period in which the track jumping operation is performed, the tracking control loop is temporarily made by the switch 41 to be off. Then, a jump pulse outputted from a jump pulse generating circuit 20 is added by the adder 42 to the driver. Upon completion of the duration of the jump pulse, the switch 41 is turned on. Then, the tracking control loop is made to be on again.

Figure 11:
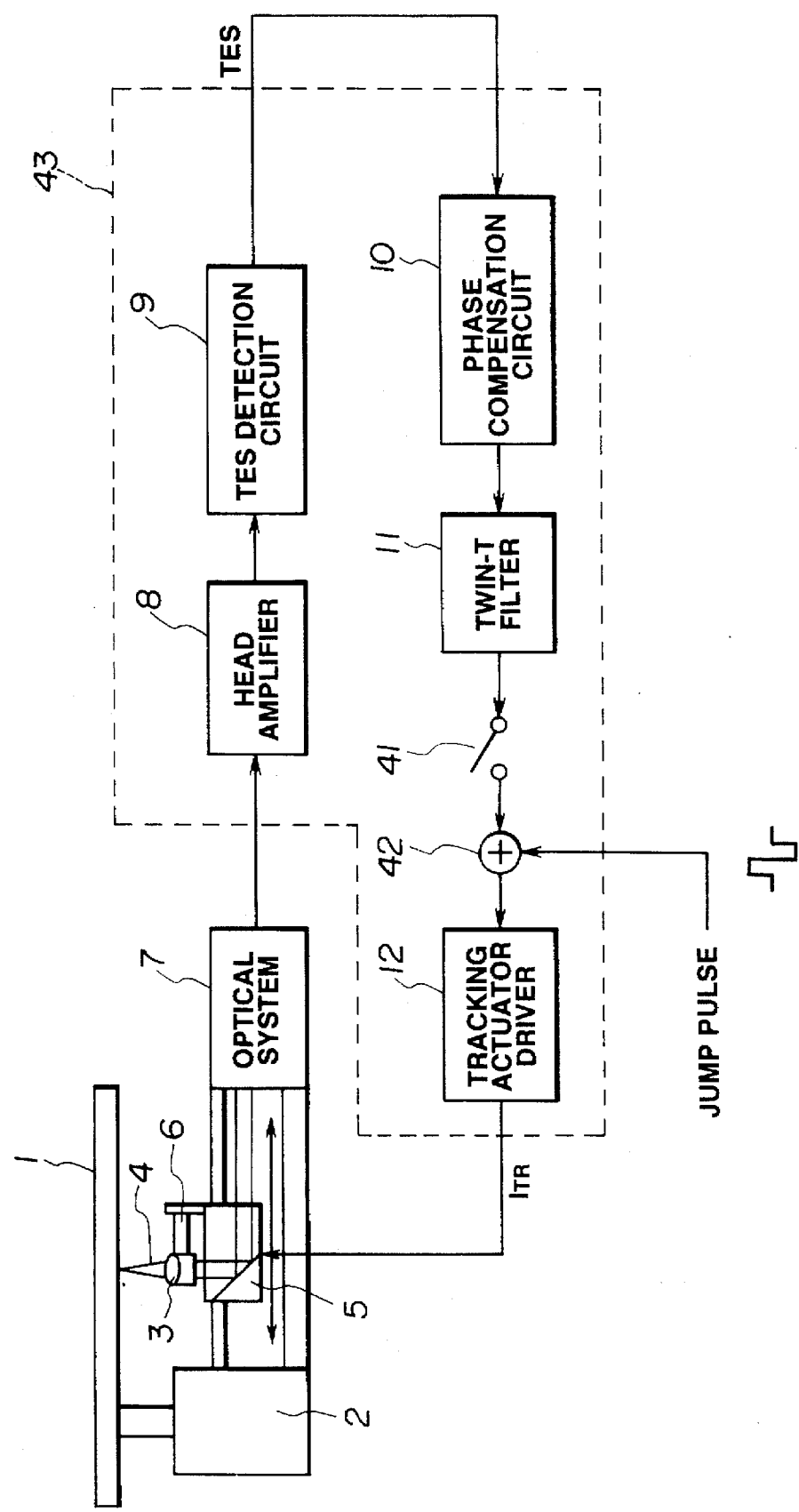
FIG. 11 is a block diagram illustrating an example of the configuration of a tracking control system for performing a track jumping operation in an optical disk apparatus of a third embodiment of the present invention.

In the case of this embodiment, the adder 42 is provided posterior to (namely, at the tracking-actuator side of) the twin-T filter 11 as illustrated in FIG. 11. Thereby, the jump pulse can be prevented from being affected by the twin-T filter. Further, the light beam can be driven by a pulse as intended. Consequently, a stable track jumping operation can be achieved.

Figure 12:
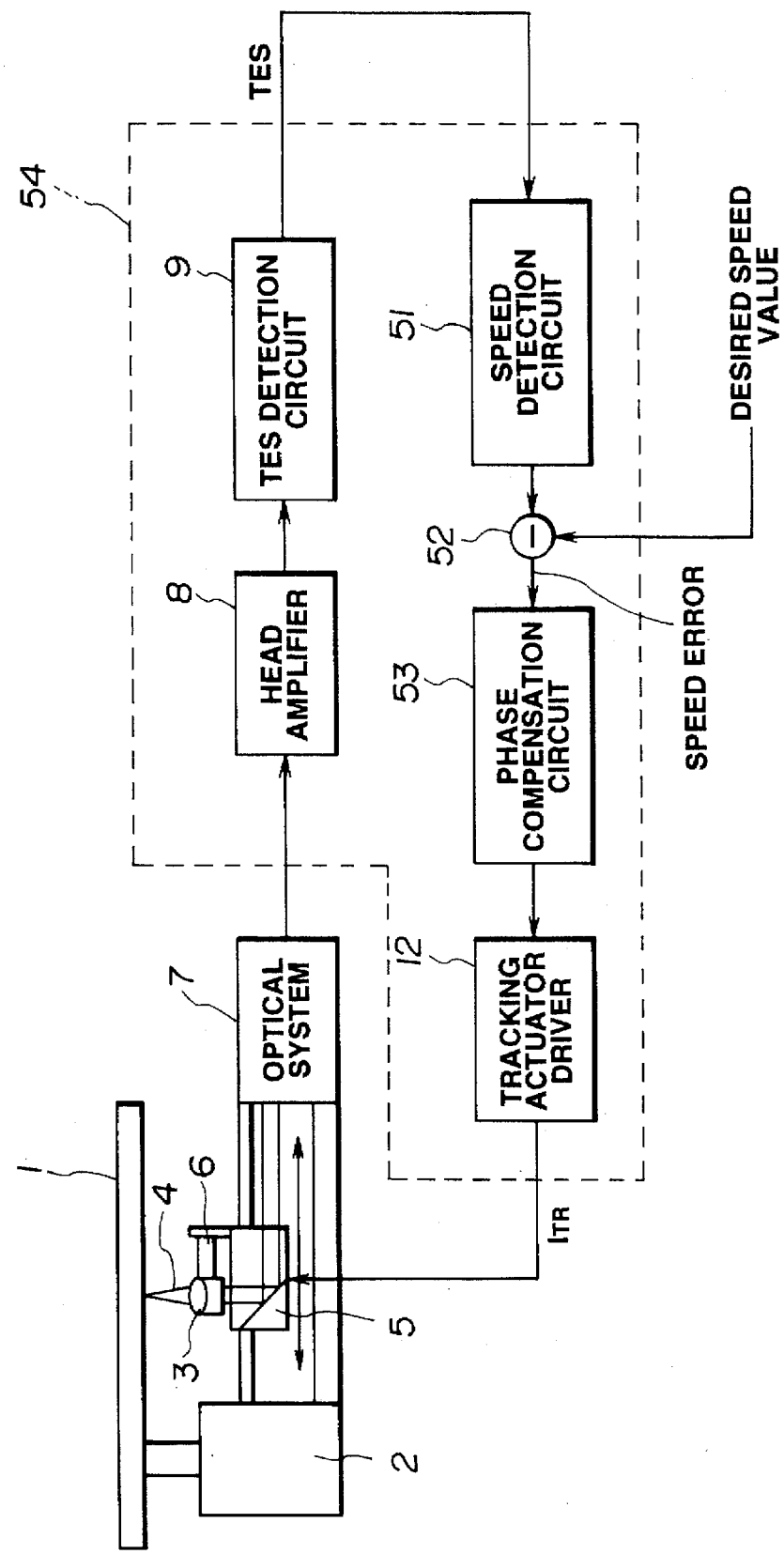
FIG. 12 is a block diagram illustrating the configuration of a seek control system of an optical disk apparatus according to a fourth embodiment of the present invention.

Referring next to FIG. 12, there is shown an example of the configuration of a seek (access) control system, as a fourth embodiment of the present invention. In this figure, the drawing of parts having no direct bearing on the description of this embodiment is omitted. Incidentally, in this figure, like reference characters represent like composing elements of the first embodiment. Further, the description of such composing elements is omitted herein.

In the case of the fourth embodiment, a speed control circuit 54 having: a speed detection circuit 51, which is used to detect a relative speed of the light beam 4 emitted from the tracking error signal (TES) detection circuit with respect to an information track on the optical disk 1; a subtracter 52, which acts as a speed error detection means for obtaining the difference between an actual speed detected by the speed detection circuit 51 and a desired speed value determined from the number of the remaining tracks during the seek operation; and a phase compensation circuit 53 for performing a phase compensation operation so as to stabilize an operation of the seek control system is configured in a stage subsequent to the tracking error signal detection circuit 9.

The speed detection circuit 51 first founds a period (or cycle) of occurrences of the zero-crossing in the tracking error signal. Then, the speed detection circuit 51 obtains a speed, at which the light beam 4 actually crosses an information track, by dividing the interval between zero-crossing points (usually, a distance which is half a track pitch) by the found period. This travelling speed of the light beam is not always matched with the absolute moving speed of the carriage 5 due to the influence of the aforementioned displacement in the tracking direction of the objective lens upon driving the focus actuator and to the influence of the eccentricity of the information tracks.

Next, an operation of the seek control system configured in this way will be described hereinbelow.

When an seek operation of moving the light beam 4 to a target track position is started, the tracking control becomes off. Then, a speed control operation of the speed control circuit 54 is commenced. When the light beam 4 goes across one of the information tracks on the optical disk 1, a sinusoidal tracking error signal of one period is obtained by the tracking error signal detection circuit 9, as previously described. Thus, the tracks can be counted by monitoring this tracking error signal. Thereby, the number of the remaining tracks during the seek operation is found. Consequently, a desired speed value corresponding to the number of the remaining tracks is obtained by a controller (not shown) which then outputs a signal representing the desired speed value to the subtracter 52.

Further, the subtracter 52 calculates a speed error which is the difference between the desired speed value and the speed detected by the speed detection circuit 51. After the phase compensation is performed by the phase compensation circuit 53, a signal representing a speed error is inputted to the tracking actuator driver 12 as the speed error signal. Subsequently, the carriage 5 is driven according to the driving signal $I_{TR}$, which is outputted from the tracking actuator driver 12 on the basis of this speed error signal, in such a way that the speed error becomes smaller (namely, the detected value of the speed comes closer to a speed indication value). The speed control is performed by keeping performing this operation. Incidentally, this speed control is made to be off immediately before the light beam 4 reaches the target track. Then, the operation of the apparatus returns to the tracking control operation.

Here, if the open-loop (or overall) gain crossover frequency of the speed control loop is set at 500 Hz or so, the relative speed of the light beam with respect to the information track can be controlled with necessary and sufficient accuracy regardless of the displacement in the tracking direction of the objective lens, which is caused by being driven by the focus actuator, and the eccentricity of the information tracks.

The gain crossover frequency can be determined by performing the following calculation. Assuming that the eccentric acceleration of the optical disk is 15 m/s² similarly as in the case of the first embodiment and that the speed servo system is configured in such a way that the speed error is not more than 5 mm/s, the necessary gain G at the frequency f [Hz] is given by:

$$G=15/(2\pi f)/5\times10^{-3} \qquad (3)$$

Thus, the gain crossover frequency, namely, a frequency at which the gain G is 1 (namely, 0 dB), is 480 Hz or so. The speed servo system is a first-order element (or system) and is thus stable even if the phase compensation is not performed. Therefore, this obtained value is employed as the value of the gain crossover frequency, without modification thereof.

Incidentally, if the gain crossover frequency is set at a value which is higher than the obtained value, the speed control can be achieved with further higher accuracy. However, there occurs the possibility of putting the control system into an unstable state owing to the high-order resonance of the actuator. In such a case, although the control system can be stabilized by adding a twin-T filter to the circuit similarly as in the case of the first embodiment, the complexity of the configuration of the control system is increased owing to the addition of the twin-T filter. If the gain crossover frequency of the speed control loop is 300 to 1000 Hz or so, sufficient accuracy of the speed control is obtained. Moreover, the speed control can be achieved without being affected by the high-order resonance. Consequently, the control system can be stabilized without the twin-T filter.

As above stated, in accordance with this embodiment, when a seek operation is performed by using the actuator which supports the objective lens in such a way as to be movable in the focusing direction and as to be almost fixed in the tracking direction and serves as both of a coil for a tracking control operation and a coil for an access control operation, a signal representing an error in obtaining the relative speed of the light beam with respect to an information track is fed back to a coil for driving the carriage. Further, the overall loop gain crossover frequency is set at a value which is not lower than 300 Hz. Thereby, even when the displacement in the tracking direction of the objective lens, which is caused by being driven in the focusing direction, and the eccentricity of the information tracks occurs, the relative speed of the light beam with respect to the information track and the displacement can be controlled with necessary and sufficient accuracy. Thereby, a more stable seek operation can be achieved. Thus, the probability of an occurrence of a correction seek operation can be decreased. Consequently, an access time can be reduced. Moreover, because the gain crossover frequency of the speed control loop is set at 500 Hz or so, namely, set in such a manner as to be lower than the gain crossover frequency of the tracking control loop, the frequency band of a signal fed back to the coil is in a low frequency zone. It is thus unnecessary to provide a twin-T filter in the speed control loop correspondingly to the high-order resonance of the actuator. As a result, the configuration of the control system can be simplified.

Incidentally, in the aforementioned embodiments, an actuator, which serves both of the fine actuator and the coarse actuator and is constituted as a single unit, is used. Even in the case that this actuator is of the type that has previously been used and obtained by providing a fine actuator on a coarse actuator, such an actuator can be applied to the tracking actuator if the high-order resonance frequency thereof is relatively low in comparison with the gain crossover frequency of the control system. Needless to say, such an actuator may be applied not only to the tracking actuator but also to other actuators such as the focus actuator.

Additionally, as described in the foregoing description of the first embodiment, each of the filters such as the twin-T filter and the phase lead compensation filter may be a filter for use in analog circuits. Further, as described in the aforesaid description of the second embodiment, each of such filters may be realized by constituting a digital filter by performing software in a DSP (Digital Signal Processor) or the like. Incidentally, the accuracy of the filter characteristics can be further enhanced by using digital filters. In the case of using digital filters, there is no variation in characteristics of, particularly, the notch filter means. Thus, the filter means can cope with a change in the high-order resonance frequency in a wider frequency range.

Further, the control characteristics of the system can be further enhanced by adding a filter to each of the aforementioned embodiments. If, for example, a phase compensation filter is added thereto, the trackability of the system to follow the track in a low frequency zone can be enhanced. Furthermore, if a high-reject filter is added thereto correspondingly to a suitable cut-off frequency, the influence of high-frequency noises can be alleviated.

Further, if necessary, a twin-T filter may be provided in the fourth embodiment. Furthermore, the number of twin-T filters to be provided therein is not limited to 1. Namely, a plurality of twin-T filters may be provided in the fourth embodiment.

As above described, the aforementioned embodiments have an advantage in that the a control circuit, which can perform both of a sufficiently accurate tracking control operation and an accurate access control operation, of an optical disk apparatus can be provided even in the case where the optical disk apparatus uses an actuator serving as a coil for performing both of a tracking control operation and an access control operation.

Further, the aforementioned embodiments have advantages in that a servo system being capable of responding to a change in the high-order resonance frequency can be realized by achieving the insertion of a notch filter, which has a narrow band and a small Q, even when the high-order resonance frequency of an actuator is close to the gain crossover frequency of the servo system and thus the dip frequency of a notch filter has to be close to the gain crossover frequency, and that the servo system, which has a simple structure, can be configured at a low cost.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A control circuit of an optical disk apparatus, comprising:

a carriage, which is provided with a focus moving means for supporting an objective lens in such a way that the objective lens is movable in a direction of an optical axis of a light beam applied to the optical disk apparatus through the objective lens and is substantially fixed in a direction perpendicular to an information track on the optical disk, for moving the light beam in a direction substantially perpendicular to the information track in a range in which at least the information track is present;

carriage driving means for driving the carriage; and a tracking error detecting circuit for detecting a tracking error signal which represents a displacement of the light beam from a center of the information track, wherein a tracking control loop for performing a tracking control by feeding back a dc-component and ac-components, whose frequencies are not more than 10 kHz, of the tracking error signal to the carriage driving means is formed, wherein a filter means for attenuating a gain of the tracking control loop correspondingly to a frequency in vicinity of a resonance frequency in a direction, in which the one of the focus moving means and the carriage crosses the information track, is provided in the tracking control loop, wherein an open-loop gain crossover frequency of the tracking control loop is not less than 2 kHz.

2. The control circuit of the optical disk apparatus according to claim 1, which further comprises:

jump pulse generating means for generating a pulse, which accelerates the light beam to an adjacent track, and a pulse which decelerates the light beam to an adjacent track; and addition means, provided between the filter means and the carriage driving means, for adding an output of the jump pulse generating means to the tracking control loop.

3. A control circuit of an optical disk apparatus, having:

a carriage, which is provided with a focus moving means for supporting an objective lens in such a way that the objective lens is movable in a direction of an optical axis of a light beam applied to the optical disk apparatus through the objective lens and is substantially fixed in a direction perpendicular to an information track on the optical disk, for moving the light beam in a direction substantially perpendicular to the information track in a range in which at least the information track is present;

carriage driving means for driving the carriage; and a tracking error detecting circuit for detecting a tracking error signal which represents a displacement of the light beam from a center of the information track, the control circuit further comprising:

speed detecting means for calculating a travelling speed of the light beam from a period of the tracking error signal when moving the carriage; and speed error detection means for obtaining a speed error signal which represents a speed error as a difference between the travelling speed detected by the speed detecting means and a target speed, wherein a speed control loop for performing a speed control operation by feeding back the speed error signal to the carriage driving means.

4. The control circuit of the optical disk apparatus according to claim 3, wherein an open-loop gain crossover frequency of the speed control loop is set at a value between 300 Hz and 1 kHz.

5. A control circuit of an optical disk apparatus, having:

a carriage, which is provided with a focus moving means for supporting an objective lens in such a way that the objective lens is movable in a direction of an optical axis of a light beam applied to the optical disk apparatus through the objective lens and is almost fixed in a direction perpendicular to an information track on the optical disk, for moving the light beam in a direction nearly perpendicular to the information track in a range in which at least the information track is present;

carriage driving means for driving the carriage; and a tracking error detecting circuit for detecting a tracking error signal which represents a displacement of the light beam from a center of the information track, wherein a first frequency band of signals is fed back to the carriage driving means during a seek control operation of controlling the light beam to cross the information track, and wherein a second frequency band of signals is fed back to the carriage driving means during a tracking control operation of causing the light beam to follow the information track, and wherein said first frequency band of signals is lower than said second frequency band of signals.

6. A control circuit of an optical disk apparatus comprising:

an error signal detecting means for detecting a servo error signal from reflected light obtained by applying a light beam to an optical disk;

a phase lead compensation means for performing a phase compensation of the servo error signal;

a notch filter means for attenuating a gain of the servo error signal at a predetermined frequency; and an actuator for controlling a position of the light beam, wherein a control loop is formed by feeding back the servo signal to the actuator through the phase lead compensation means and the notch filter means, wherein a crossover frequency (a pole frequency) of the phase lead compensation means at a higher frequency side is set to be higher than a frequency (a dip frequency) at which a gain of the notch filter means is minimized.

7. The control circuit of the optical disk apparatus according to claim 6, wherein the actuator includes a carriage that is provided with a focus moving means being operative to support an objective lens for converging the light beam onto the optical disk so that the objective lens is movable in a direction of an optical axis and is substantially fixed in a direction perpendicular to an information track on the optical disk, for moving the light beam in a direction substantially perpendicular to the information track in a range, in which at least the information track is present, and is provided with a coil for driving the carriage, wherein the servo error signal is a tracking error signal representing a positional difference between the light beam and a center of the information track on the optical disk, wherein the tracking error signal is fed back to the coil through the phase lead compensation means and the notch filter means.

8. The control circuit of the optical disk apparatus according to claim 6, wherein the maximum phase lead in the phase lead compensation means is not less than 80 degrees.

9. The control circuit of the optical disk apparatus according to claim 6, wherein the phase lead compensation means comprises a first first-order phase lead filter and a second first-order phase lead filter which are connected in series.

10. The control circuit of the optical disk apparatus according to claim 9, wherein a ratio between corner frequencies of the phase lead filters (a ratio between a zero-point frequency and a pole frequency) is not less than 5.

11. The control circuit of the optical disk apparatus according to claim 6, wherein the notch filter means comprises a twin-T filter.

12. The control circuit of the optical disk apparatus according to claim 6, wherein attenuation characteristics of the notch filter means is set at a value of not more than 3.0.

13. The control circuit of the optical disk apparatus according to claim 6, wherein a frequency (a dip frequency), at which a gain of the notch filter means is minimized, is not more than about 5 times an open-loop gain crossover frequency.

14. The control circuit of the optical disk apparatus according to claim 9, wherein the notch filter means is provided between the first first-order phase lead filter and the second first-order phase lead filter.

15. The control circuit of the optical disk apparatus according to claim 6, wherein each of the phase lead compensation means and the notch filter means is constituted by a digital filter.

* * * * *